Figure 1:
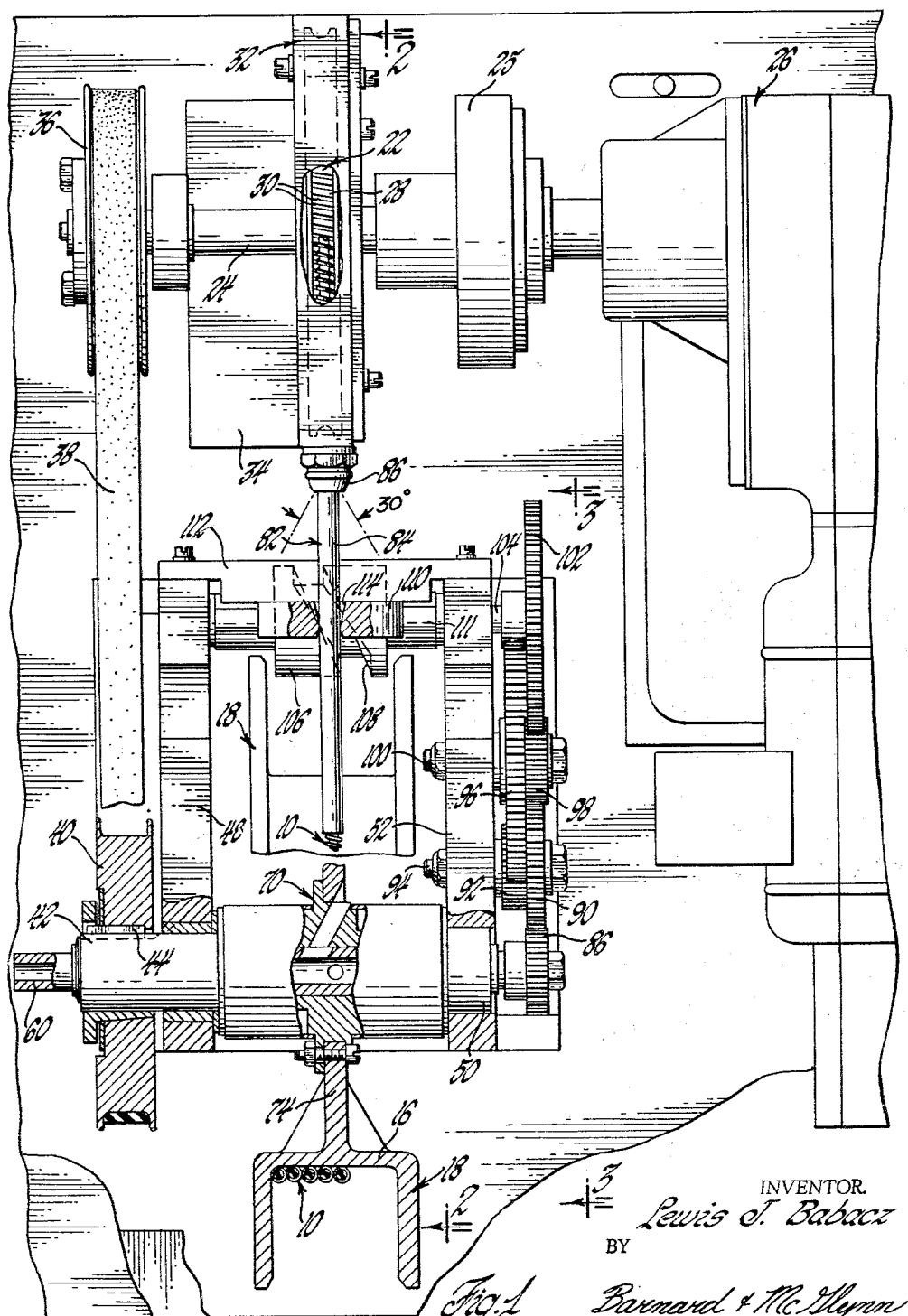

Dec. 22, 1964  L. J. BABACZ  3,162,425
CABLE STORAGE AND DRIVE MECHANISM
Filed March 19, 1962  3 Sheets-Sheet 1

INVENTOR.
Lewis J. Babacz
BY
Barnard & McGlynn
ATTORNEYS

INVENTOR:
Lewis J. Babacz
BY
Barnard & McGlynn
ATTORNEYS

Dec. 22, 1964 L. J. BABACZ 3,162,425
CABLE STORAGE AND DRIVE MECHANISM
Filed March 19, 1962 3 Sheets-Sheet 3

INVENTOR.
Lewis J. Babacz
BY
Barnard & McGlynn
ATTORNEYS

United States Patent Office 3,162,425
Patented Dec. 22, 1964

3,162,425
CABLE STORAGE AND DRIVE MECHANISM
Lewis J. Babacz, Philadelphia, Pa., assignor to Teleflex Incorporated, North Wales, Pa., a corporation of Delaware
Filed Mar. 19, 1962, Ser. No. 180,594
5 Claims. (Cl. 254—175.7)

The present invention relates to a cable storage and drive mechanism designed to store, wind and unwind loaded cable evenly and at a constant predetermined tension without introducing shock loads into the cable.

More specifically, the present invention is particularly applicable to the winding and storage of hollow cable of the drivable type, such as that shown in copending application Serial No. 169,050 Babacz, filed January 26, 1962. The drivable cable with which the subject invention is concerned is adapted to be stored on a reel from which it is wound and unwound to control or position any appropriate device, e.g. a thermocouple, in relation to a remote or inaccessible installation such as a frame.

The installations in which such cables are utilized are frequently intended to operate for long periods of time without attention. However, in the past such cables have themselves proved to be one of the weak components in such installations due to excessive cable wear with the result that such component is replaced much more frequently than any other part of the system.

Where such a hollow drivable cable in turn internally carries electrical lead wires, as in the aforenoted copending application, the cable failure has also been occasioned by failure of the electrical wires due to repeated shock loads imposed thereon. Such wire failure has in part been due to the twisting of such wires and which twisting is avoided by the non-twisting mechanism provided in said copending application.

The other source of such cable failure is attributable to shocks induced into the cable or into the electrical lead wires as the cable is wound and unwound in relation to the storage reel and the cable driving mechanism. The subject mechanism is designed to obviate cable wear heretofore attributable to the longitudinal shock loads accompanying winding and unwinding of the cable.

In general, the subject mechanism includes a unique load limiting and load applying mechanism intermediate the storage reel and the reel driving mechanism which precludes sudden shocks being applied to the cable and at the same time insures that the cable storage reel will be prevented from rotating faster than the cable feeding mechanism which can itself induce shocks into the cable as well as causing undue cable flexure.

In a particular installation to which the subject invention is applied, the cable feeding and storage reel rotating mechanisms are actualy independent and in which case the subject invention coordinates their driving actions relative to the cable in such a way as to insure the cable will at all times be under a predetermined tension, which facilitates cable storage, insures that the cable will not be subjected to shock loads and thereby greatly increases cable life.

More specifically, the subject mechanism includes a first device for driving the cable either to wind or unwind the same in relation to the storage reel and a second device for driving the storage reel to wind cable thereon. The second device including means for limiting the tension load applied to the cable in winding the same on said drum and additional means for creating a drag or friction load on said storage reel as said first device drives said cable to unwind the same from said reel.

The details as well as other objects and advantages of the present invention will be apparent from a perusal of the detailed description which follows taken in conjunction with the drawings.

Figure 2:
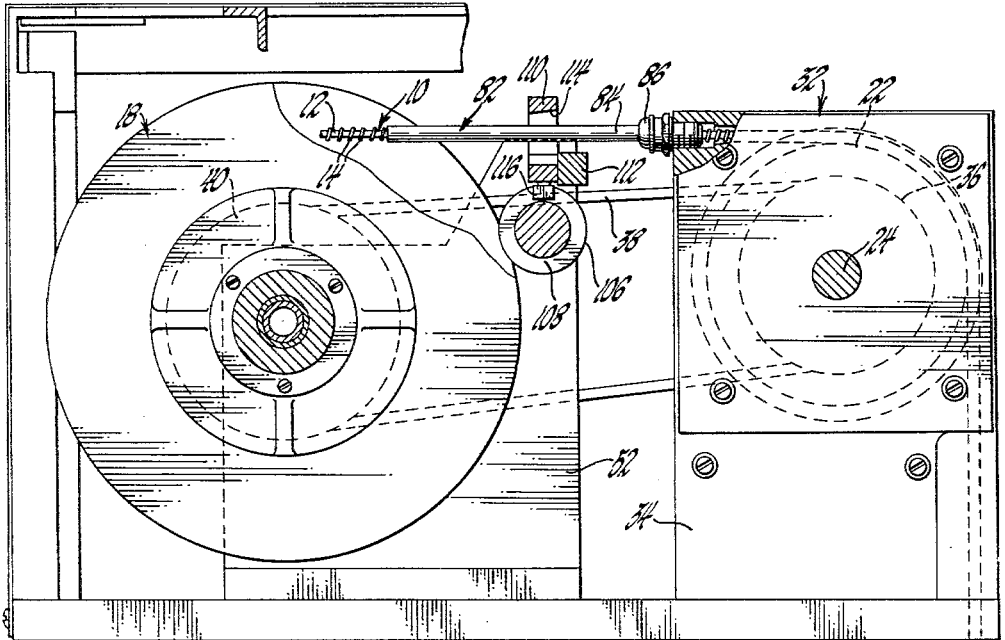
Figure 3:
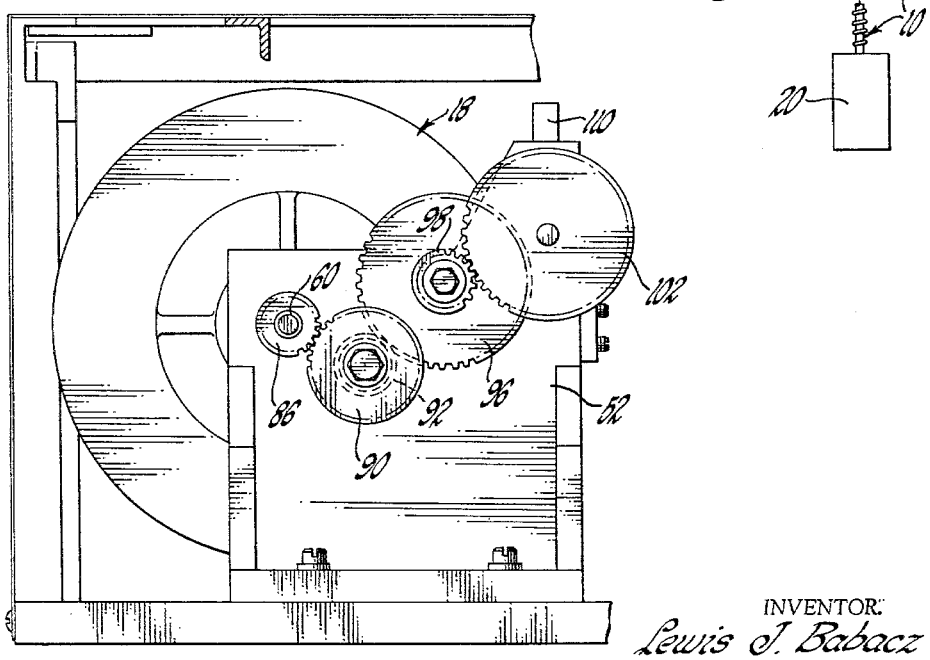
Figure 4:
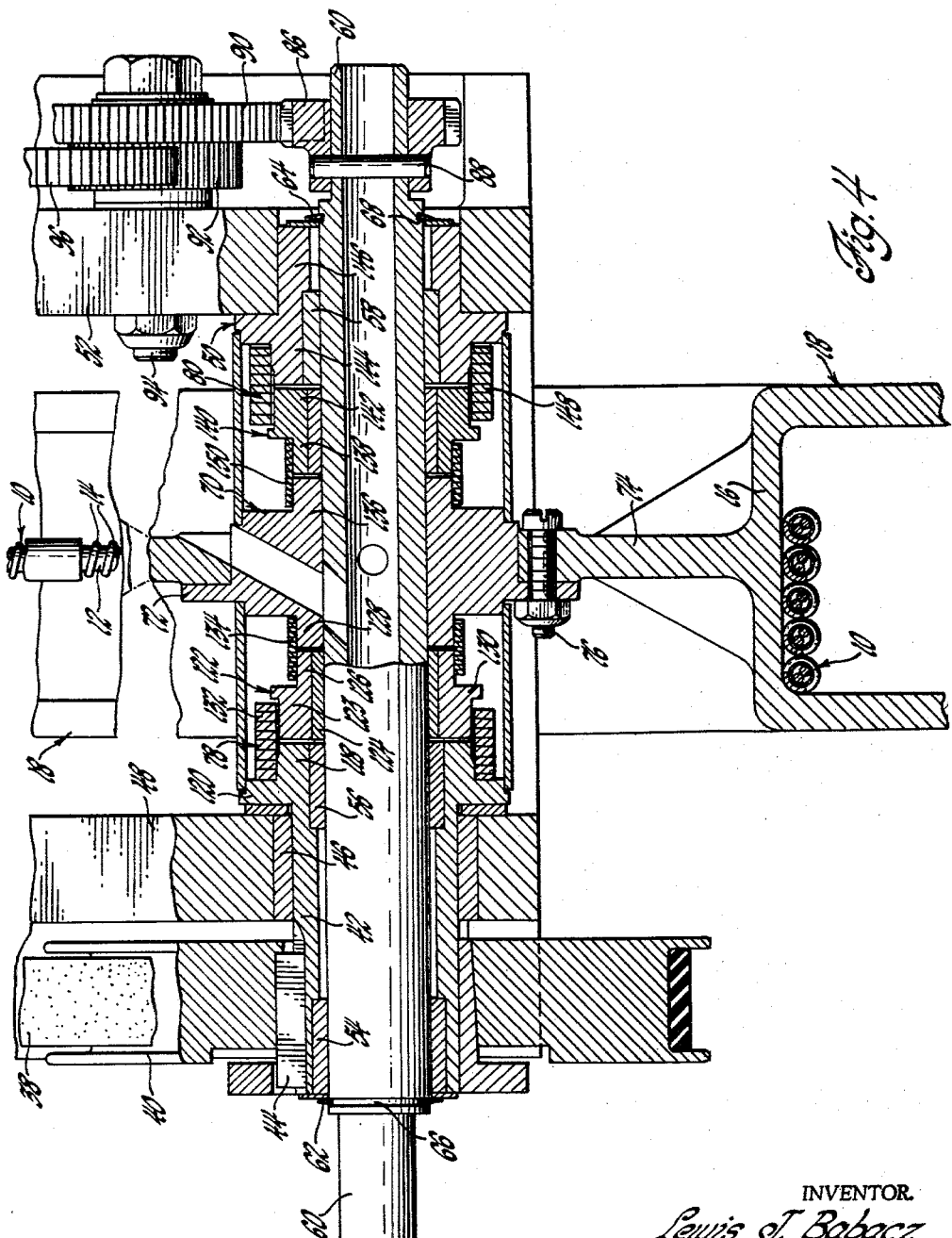

In the drawings:
FIGURE 1 is a partially sectioned plan view of a cable actuating system embodying the subject invention;
FIGURE 2 is a view along line 2—2 of FIGURE 1;
FIGURE 3 is a view along line 3—3 of FIGURE 1;
FIGURE 4 is an enlarged sectional view of the subject cable load controlling mechanism.

An installation embodying the subject invention is shown generally in FIGURE 1. It is to be understood that the invention may be applied to many different types of installations including that shown in the aforenoted copending application the latter which also includes a mechanism for preventing the cable from being twisted during coiling and uncoiling operation. Hollow cable 10, per se, may be of any satisfactory drivable type such as shown in the aforenoted Babacz application or that shown in Serial No. 100,833 Kompanek et al. filed April 5, 1961. In general, the hollow cable includes a flexible inner core structure 12 which is overlaid with a relatively heavy driving wire member 14 the adjacent convolutions of which are equally spaced longitudinally along the cable.

Referring to FIGURES 1 and 2, one end of cable 10 is adapted to be secured to the spool 16 of a storage reel member 18 while the other end is adapted to have any suitable control or sensing device 20 secured thereto and which latter drive is adapted to be positioned or actuated in accordance with cable movement. In the illustration of FIGURE 2, device 20 may be a thermocouple variably positionable within a heat source such as a furnace.

A cable driving wheel 22 is fixed for rotation with a shaft 24 which, in turn, is adapted to be driven through a flexible coupling 25 by a motor-gear mechanism indicated generally at 26. Driving wheel 22 includes a formed outer periphery 28 having circumferentially spaced recesses 30 formed therein corresponding in size and inclination to the convolutions of cable driving wire 14. Cable 10 is adapted to engage with the driving periphery of wheel 22 so that as motor mechanism 26 is energized the wheel will drive the cable either toward or away from storage reel 18 and thus to wind or unwind said reel.

Cable driving wheel 22 is actually enclosed in a casing 32 which rotatably supports motor driven shaft 24. Casing 32 is in turn fixedly mounted on a vertical support member 34. Shaft 24 extends axially beyond support member 34 and has a pulley member 36 fixed thereto. Pulley 36 is adapted to drive a belt 38 the other end of which drives a pulley 40 fixed to a hollow shaft element 42 through a key 44.

Hollow shaft 42 is rotatably mounted in a bearing member 46 disposed within a vertical support member 48.

A collar element 50 is fixed within a second support member 52. Shaft 42 and collar 50 respectively include internal bearing elements 54, 56 and 58 upon which a second hollow shaft 60 is rotatably supported. Shaft 60 extends outwardly beyond supports 48 and 52.

Shaft 60 is retained against longitudinal movement by washers 62 and 64 snapped within shaft grooves 66 and 68.

A hub member 70 is fixedly mounted upon shaft 60. Hub 70 has a radially extending flange portion 72 to which the web 74 of storage reel 18 is fixedly secured through suitable nut and bolt means 76.

A slip clutch assembly indicated generally at 78 is adapted to transmit drive from pulley driven shaft 42 to storage reel 18 and the details of which drive transmission and assembly will subsequently be considered in greater detail.

A drag clutch assembly indicated generally at 80 is disposed generally on the opposite side of hub 70 from the slip clutch assembly. The purpose and operation of drag clutch assembly 80 will also be considered in greater detail subsequently.

A level wind mechanism indicated generally at 82 is also provided to facilitate reduction of wear on cable 10. Level wind mechanism 82 includes a tubular member 84 adapted to slidably receive cable 10 and is cantilever-mounted at one end through a ball joint connection 86 loosely articulated to cable driving wheel casing 32. Referring to FIGURE 1, it will be seen that cable laying tube 84 is swingable about its ball joint connection through an angle of approximately 30° to permit the cable to be evenly laid upon storage reel 18 and thereby reducing cable wear through inadvertent jambing or overlapping of the cable convolutions on the reel.

To positively control the laying of cable 10 upon storage reel 18 in direct relationship to storage reel rotation, the level wind mechanism also includes a gear train comprising a first gear element 86 fixed through pin 88 to shaft 60. A double gear member including a large gear 90 and a small gear 92 is rotatably supported upon a stub shaft 94 fixed to support member 52. Large gear 90 meshes with and is driven by shaft gear 86. Small gear 92 meshes with large gear 96 of a second double gear member which includes a small gear 98. Double gear 96–98 is also rotatably supported upon a stub shaft 100 fixed to support 52. Small gear 98 drives a large gear 102 fixed to shaft 104 which is rotatably supported within support members 48 and 52.

A cylindrical member 106 is also fixed to shaft 104 for rotation therewith and includes a follower groove or cam surface 108 formed peripherally therein.

A cable tube guide member 110 is attached to a member 111 which is reciprocably mounted between supports 48 and 52. Cross member 112 secured to supports 48 and 52 provides a bearing-guide for reciprocating member 111. The bottom portion of guide member 110 includes a depending follower portion 116 adapted to project within cam slot 108 formed in cylindrical member 106. As best seen in FIGURE 1, cam slot 108 is longitudinally offset relative to cylindrical member 106 such that as the member rotates in response to storage reel rotation transmitted through the aforesaid gear train, follower portion 116 will track within the cam slot to convert the rotary motion of member 106 into the reciprocable movement of guide member 110. The reciprocable movement of member 110, in conjunction with storage reel rotation, causes cable tube 84 to progressively lay cable 10 across the storage reel spool 16 so as to prevent the cable convolutions from being unevenly loaded thereon.

The manner and mechanism for controlling the rotation of storage reel 18 will now be considered in greater detail. The directions of rotations of the members now to be described are by reference to the parts as viewed in FIGURE 2.

Referring to the slip clutch assembly 78, as seen in FIGURE 4, it is to be noted that hollow pulley shaft 42 includes a radially enlarged portion at the inner end thereof forming a drum 118 and a radially extending flange 120. A first intermediate drum member 122 including a portion 123 of approximately the same outside diameter as drum portion 118 of pulley shaft 42 is rotatably mounted upon storage reel shaft 60 through a sleeve bearing 124. Intermediate drum 122 includes a second portion 126 of reduced diameter which is adapted to axially abut a shoulder 128 formed on storage reel hub 70. Shoulder 128 is of the same diameter as portion 126 of intermediate drum 122. The two different diameter portions 123 and 126 of intermediate drum 122 are separated by a radial flange 130.

Drive is adapted to be transmitted between hollow pulley shaft 42 and intermediate drum 122 through a wound, e.g. right hand, spring member 132 which is basically coiled and stressed so as to frictionally engage portions 118 and 123 of shaft 42 and intermediate drum 122 to releasably connect said shaft and said drum.

Coiled spring clutch member 132 may be coiled and stressed to frictionally engage portions 118 and 123 of pulley shaft 42 and intermediate drum 122 with any predetermined force. In the illustrated installation, spring clutch 132 has an overrun drag of 50 to 70 pound inches. In other words, when the load between pulley shaft 42 and intermediate drum 122 exceeds the 50 to 70 pound inch overrunning torque rating of the spring clutch member, the spring clutch will slip permitting the pulley shaft 42 to overrun storage reel 18.

Assuming the torque transmitting capacity of spring 132, e.g. 50 to 70 pound inches, is not exceeded, rotation of pulley shaft 42 will thereby cause intermediate drum 122 to be driven at this same rotative speed. In order to further transmit this drive to storage reel 18 another wound, e.g. left hand, spring clutch element 134 is provided and is supported by reduced diameter portion 126 of the intermediate drum 122 and shoulder 128 of storage reel hub 70. When intermediate drum 122 is being driven by pulley 40 to wind cable 10 upon reel 18, spring element 134 will wind down and drivingly connect intermediate drum 122 and hub 70 causing rotation of the storage reel.

Should the driving tension on cable 10 exceed the 50 to 70 pound inch overrunning torque rating of the slip clutch member 132, pulley shaft 42 will overrun intermediate drum 122 thereby preventing the imposition of unduly high loads on the cable member.

The driving operation between pulley 40 and storage reel 18, as just described, is occasioned by counterclockwise rotation of pulley 40, as viewed from FIGURE 2, which winds cable 10 upon storage reel 18.

At the same time storage reel 18 is being thus rotated to coil cable 10 thereupon, cable driving wheel 36 is being rotated in the same direction to feed the cable to the storage reel. The cable storage mechanism is designed so that when winding cable 10 on storage reel 18, the ratio of the storage reel spool diameter and its r.p.m. relative to the driving wheel pitch diameter and its r.p.m. is such that the storage reel always tends to wind up more cable than the driving wheel feeds to it. Since the storage reel is wniding on more cable than is being fed to it, the cable pull load on the storage reel is increased until it exceeds the predetermined overrun drag torque of the slip clutch member 132 thereby allowing pulley 40 and its shaft 42 to overrun until the excess cable pull load falls below the overrun drag torque of said slip clutch member. In this way the cable is maintained under a predetermined tension.

Drag clutch assembly 80 is generally similar in construction although it functions differently than does slip clutch assembly 78. As viewed in FIGURE 4, the left hand side of storage reel hub 70 is substantially identically formed as the right side and includes a cylindrical shoulder 136 of the same diameter as a proximately disposed portion 138 of a second intermediate drum 140. Intermediate drum 140 also includes an enlarged diametrical portion 142 corresponding in size to a portion 144 of fixed collar 50. Collar 50 includes an axially extending portion 146 fixedly mounted within storage reel support member 52.

In this assembly also, a slip or drag clutch spring member 148 is coiled about portions 142 and 144 of intermediate drum 140 and collar 50 to commonly frictionally engage these members. In this particular illustration spring member 148 is left hand wound. Another wound, e.g. right hand, spring clutch member 150 is adapted to releasably connect the second intermediate drum 140 with storage reel hub 70.

When the storage reel 18 is driven by pulley 40 to wind cable 10 thereupon, spring clutch 150 unwinds or releases and thereby interrupts any driving connection between reel hub 70 and intermediate drum 140. Thus, the drag clutch assembly 80 is inoperative during cable coiling rotation of storage reel 18.

On the other hand, when cable driving wheel 36 is rotated in a clockwise direction, as viewed in FIGURE 2, to uncoil cable 10 from reel 18, spring clutch member 134 of the slip clutch assembly 78 unwinds or releases thereby interrupting the driving connection between pulley 40 and storage reel 18. At the same time, the uncoiling actuation of driving wheel 36 in pulling on cable 10 causes spring 150 of drag clutch assembly 80 to couple storage reel hub 70 to intermediate drum 140 and thereby impart a rotative movement thereto. However, drag clutch element 148 is stressed so as to bind upon shoulders 142 and 144 and thereby resist rotation of intermediate drum 140 with a predetermined force. In this way an overrun drag is imposed on storage reel 18 by drag clutch element 148 which keeps cable 10 under the proper tension and prevents the storage reel from overrunning during uncoiling. It is apparent that if storage reel 18 was not so restrained against overrunning, reel rotation would be jerky thereby introducing intermittent shock loads and undue flexing on cable 10 thereby contributing materially to its wear and ultimate failure.

While a preferred embodiment of the subject invention has been shown and described, it is apparent that various structural modifications may be made within the intended scope of the invention as set forth in the hereinafter appended claims.

I claim:

1. A cable storage and drive apparatus comprising a cable storage reel, a flexible cable of the type including electrical lead wires disposed therein and having a convoluted wire formed on the exterior thereof, a first support structure, a shaft rotatably mounted in said support structure, said storage reel being fixed for rotation with said shaft, a second support structure, a second shaft rotatably mounted in said second support structure, power means, means operatively connecting said power means to drive said first and second shafts, a cable driving member fixed for rotation with said second shaft and having a convoluted periphery corresponding to and coacting with the wire formed on said cable, said member being adapted to move said cable in a coiling or uncoiling direction relative to the storage reel, said connecting means including a clutch assembly disposed intermediate said power means and said first shaft, said clutch assembly including a first preloaded spring device adapted to prevent the driving force transmitted from said power means to said storage reel from exceeding a predetermined value during the coiling of said cable upon the storage reel, a second spring device for operatively disconnecting said power means from said storage reel when said cable driving member is operative to move said cable in an uncoiling direction relative to said storage reel, and a third spring device for imposing a frictional drag on said first shaft when said second spring device interrupts the operative connection between said power means and said reel.

2. A cable storage and drive apparatus as set forth in claim 1 in which said storage reel includes a hub member fixed to said first shaft, said hub member including a pair of axially extending shoulders, a hollow shaft rotatably and concentrically supported upon said first shaft, said drive connecting means operatively connecting said power means with said hollow shaft, said hollow shaft including a cylindrical portion extending toward said reel hub, a drum member rotatably mounted on said first shaft and disposed intermediate the cylindrical portion of said hollow shaft and one of said hub shoulders, said intermediate drum including a cylindrical portion of the same diameter and disposed proximate said cylindrical portion of said hollow shaft, said first preloaded spring device coacting with said cylindrical portions to frictionally connect said hollow shaft and said intermediate drum, said intermediate drum including a second cylindrical portion proximately disposed to one of said hub shoulders, said second spring device coacting with said second drum portion and said one hub shoulder to drivingly connect said intermediate drum and said reel hub when said power means is operative to rotate said hollow shaft in a cable coiling direction relative to said reel.

3. A cable storage and drive apparatus as set forth in claim 2 in which said first spring device is a coiled spring member, said first coiled spring member being adapted to frictionally connect the hollow shaft and intermediate drum as long as the driving load between said shaft and drum does not exceed the frictional engaging force between said first spring member and the subadjacent portions of the hollow shaft and intermediate drum.

4. A cable storage and drive apparatus as set forth in claim 2 in which the second spring device is a coiled spring member, said second coiled spring member being adapted to drivingly connect said intermediate drum and said reel hub when said drum is driven in a cable coiling direction, said second coiled spring interrupting the driving connection when said reel hub is driven in an uncoiling direction.

5. A cable storage and drive apparatus as set forth in claim 2 which includes a collar member concentrically disposed about said first shaft intermediate one end of said shaft and fixed to said first support structure, a second drum member rotatably supported upon said first shaft and disposed intermediate said fixed collar and the other shoulder of said reel hub, said third spring device including a clutch element coacting with said second intermediate drum and said other hub shoulder permitting said hub to overrun relative to said second intermediate drum when the storage reel is rotated in a cable coiling direction and to drivingly connect said hub and intermediate drum when said reel is rotated in a cable uncoiling direction, and a second clutch element providing a frictional drag connection between said second intermediate drum and said fixed collar during the rotation of said second intermediate drum.

References Cited by the Examiner

UNITED STATES PATENTS

| 1,575,142 | 3/26 | Wilson et al. | 254—175.7 |
|---|---|---|---|
| 1,867,596 | 7/32 | Roseman. | |
| 2,496,785 | 2/50 | Finneburgh et al. | 242—54 X |
| 2,575,012 | 11/51 | Harvey | 192—12 |
| 2,705,065 | 3/55 | Kloss | 192—41 |
| 2,885,042 | 5/59 | Frechette | 192—12 |
| 3,000,481 | 9/61 | Tomko | 192—41 X |

FOREIGN PATENTS 407,053  3/34  Great Britain.

MERVIN STEIN, Primary Examiner.

HARRISON R. MOSELEY, Examiner.

UNITED STATES PATENT OFFICE
CERTIFICATE OF CORRECTION

Patent No. 3,162,425  December 22, 1964

Lewis J. Babacz

It is hereby certified that error appears in the above numbered patent requiring correction and that the said Letters Patent should read as corrected below.

Column 1, line 21, for "frame" read -- furnace --.

Signed and sealed this 11th day of May 1965.

(SEAL)
Attest:

ERNEST W. SWIDER
Attesting Officer

EDWARD J. BRENNER
Commissioner of Patents